US012282827B2

(12) United States Patent
Huggins et al.

(10) Patent No.: US 12,282,827 B2
(45) Date of Patent: Apr. 22, 2025

(54) VIRTUAL DISTILLATION FOR QUANTUM ERROR MITIGATION

(71) Applicant: Google LLC, Mountain View, CA (US)

(72) Inventors: William Huggins, Oakland, CA (US); Jarrod Ryan McClean, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 48 days.

(21) Appl. No.: 18/036,252

(22) PCT Filed: Nov. 11, 2021

(86) PCT No.: PCT/US2021/058958
§ 371 (c)(1),
(2) Date: May 10, 2023

(87) PCT Pub. No.: WO2022/103945
PCT Pub. Date: May 19, 2022

(65) Prior Publication Data
US 2024/0013087 A1 Jan. 11, 2024

Related U.S. Application Data

(60) Provisional application No. 63/112,593, filed on Nov. 11, 2020.

(51) Int. Cl.
*G06N 10/70* (2022.01)
*G06N 10/20* (2022.01)

(52) U.S. Cl.
CPC .............. *G06N 10/70* (2022.01); *G06N 10/20* (2022.01)

(58) Field of Classification Search
CPC .............................. G06N 10/70; G06N 10/20
See application file for complete search history.

(56) References Cited

U.S. PATENT DOCUMENTS

2020/0175409 A1 6/2020 Kandala et al.
2020/0349457 A1* 11/2020 Low ...................... G06N 10/00

FOREIGN PATENT DOCUMENTS

JP 2018-530931 10/2018

OTHER PUBLICATIONS

Author: Jordan Cotler et al.; Title: Quantum Virtual Cooling; Publisher: Physical Review X; Edition: Phys. Rev. X 9, 031013—Published Jul. 29, 2019 (Year: 2019).*

(Continued)

*Primary Examiner* — Thien Nguyen
(74) *Attorney, Agent, or Firm* — Fish & Richardson P.C.

(57) ABSTRACT

Methods, systems and apparatus for determining an error-mitigated expectation value of a target observable with respect to a noisy quantum state. In one aspect a method includes obtaining multiple copies of the noisy quantum state; performing measurements on tensor products of M copies of the noisy quantum state to compute an expectation value of the target observable with respect to an entangled quantum state, wherein M?1 and eigenvalues corresponding to non-dominant eigenvectors of the noisy quantum state in the spectral decomposition of the entangled quantum state are suppressed exponentially in M; and using the computed expectation value of the target observable with respect to an entangled quantum state to determine the error-mitigated expectation value of the target observable with respect to the noisy quantum state.

18 Claims, 6 Drawing Sheets

(56) References Cited

OTHER PUBLICATIONS

Aharonov et al., "Fault-tolerant quantum computation with constant error" Proceedings of the twenty-ninth annual ACM symposium on Theory of computing, May 1997, 176-188.
Arute et al., "Observation of separated dynamics of charge and spin in the Fermi-Hubbard model" CoRR, Submitted on Oct. 2020, arXiv:2010.07965v1, 20 pages.
Arute et al., "Quantum supremacy using a programmable superconducting processor," Nature 574, 2019, 505-510.
Bacon et al., "Efficient quantum circuits for schur and Clebsch-Gordan transforms" CoRR, Submitted on Aug. 2004, arXiv:quant-ph/0407082v4, 4 pages.
Banchi et al., "Entanglement entropy scaling in solid-state spin arrays via capacitance measurements" CoRR, Submitted on Jan. 2017, arXiv:1608.03970v2, 8 pages.
Barenco et al., "Stabilization of quantum computations by symmetrization" CoRR, Submitted on Apr. 1996, arXiv:quant-ph/9604028v1, 20 pages.
Berthiaume et al., "The stabilisation of quantum computations" Proceedings Workshop on Physics and Computation. PhysComp'94, Nov. 1994, 60-62.
Biamonte et al., "Tensor networks in a nutshell" CoRR, Submitted on Jul. 2017, arXiv:1708.00006v1, 34 pages.
Bonet-Monroig et al., "Low-cost error mitigation by symmetry verification" CoRR, Submitted on Jul. 2018, arXiv:1807.10050v1, 11 pages.
Bonet-Monroig et al., "Nearly optimal measurement scheduling for partial tomography of quantum states" CoRR, Submitted on Aug. 2019, arXiv:1908.05628v1, 9 pages.
Bravyi et al., "Mitigating measurement errors in multi-qubit experiments," CoRR, Submitted on Jul. 2020, arXiv:2006.14044v2, 13 pages.
Bravyi et al., "Universal quantum computation with ideal clifford gates and noisy ancillas" CoRR, Submitted on Mar. 2004, arXiv:quant-ph/0403025v2, 15 pages.
Bridgeman et al., "Hand waving and interpretive dance: an introductory course on tensor networks" J. Phys. A: Math. Theor. 50, 223001, May 2017, 61 pages.
Brun, "Measuring polynomial functions of states" CoRR, Submitted on Jan. 2004, arXiv:quant-ph/0401067v1, 10 pages.
Cai, "Quantum Error Mitigation using Symmetry Expansion" CoRR, Submitted on Jan. 2021, arXiv:2101.03151v1, 15 pages.
Campbell, "Random compiler for fast hamiltonian simulation" CoRR, Submitted on Jun. 2019, arXiv:1811.08017v2, 11 pages.
Chen et al., "Detector tomography on IBM 5-qubit quantum computers and mitigation of an imperfect measurement" CoRR, Submitted on Apr. 2019, arXiv:1904.11935v1, 16 pages.
Childs et al., "Faster Quantum Simulation by Randomization" CoRR, Submitted on May 2018, arXiv:1805.08385v1, 19 pages.
Cirac et al., "Optimal purification of single qubits" CoRR, Submitted on Dec. 1998, arXiv:quant-ph/9812075v1, 4 pages.
Colless et al., "Computation of molecular spectra on a quantum processor with an Error-Resilient algorithm" Phys. Rev. X 8, 011021, Feb. 2018, 7 pages.
Cotler et al., "Quantum virtual cooling." Physical Review X 9.3, Jul. 2019, 031013:1-10.
Cotler et al., "Quantum overlapping tomography" Phys. Rev. Lett. 124, 100401, Mar. 2020, 6 pages.
Czarnik et al., "Error mitigation with clifford quantum-circuit data" CoRR, Submitted on May 2020, arXiv:2005.10189v1, 9 pages.
Czarnik, "Qubit-Efficient Exponential Suppression of Errors" CoRR, Submitted on Mar. 2021, arXiv:2102.06056v2, 12 pages.
Dmitriev et al., "Quasi-one-dimensional anisotropic Heisenberg model in a transverse magnetic field" CoRR, Submitted on Jul. 2004, arXiv:cond-mat/0407203v1, 4 pages.
Ekert et al., "Direct estimations of linear and nonlinear functionals of a quantum state" CoRR, Submitted on Mar. 2002, arXiv:quant-ph/0203016v1, 4 pages.
Endo et al., "Mitigating algorithmic errors in a hamiltonian simulation" CoRR, Submitted on Aug. 2018, arXiv:1808.03623v1, 8 pages.
Endo et al., "Practical quantum error mitigation for Near-Future applications" CoRR, Submitted on Dec. 2017, arXiv:1712.09271v1, 17 pages.
Fowler et al., "Surface codes: Towards practical large-scale quantum computation" Phys. Rev. A 86, 032324, Sep. 2012, 54 pages.
Garcia-Escartin et al., "The SWAP test and Hong-Ou-Mandel effect are equivalent" CoRR, Submitted on Mar. 2013, arXiv:1303.6814v1, 10 pages.
Google AI Quantum and Collaborators, "Hartree-Fock on a superconducting qubit quantum computer" CoRR, Submitted on Sep. 2020, arXiv:2004.04174v4, 30 pages.
Haah et al., "Codes and protocols for distilling T, controlled-S, and toffoli gates" Quantum 2, 71, Jun. 2018, 29 pages.
Hastings et al., "Measuring renyi entanglement entropy with quantum monte carlo" CoRR, Submitted on Mar. 2010, arXiv:1001.2335v2, 4 pages.
Ho et al., "Enhancing Quantum Models of Stochastic Processes with Error Mitigation" CoRR, Submitted on May 2021, arXiv:2105.06448v1, 20 pages.
Horodecki et al., "Direct detection of quantum entanglement" CoRR, Submitted on Nov. 2001, arXiv:quant-ph/0111064v1, 5 pages.
Horsman et al., "Surface code quantum computing by lattice surgery" New J. Phys. 14, 123011, Dec. 2012, 27 pages.
Huggins et al., "Virtual Distillation for Quantum Error Mitigation" CoRR, Submitted on Aug. 2021, arXiv:2011.07064v3, 26 pages.
Huggins et al., "Efficient and noise resilient measurements for quantum chemistry on Near-Term quantum computers" CoRR, Submitted on Jul. 2019, arXiv:1907.13117v1, 8 pages.
International Search Report and Written Opinion in International Appln. No. PCT/US2021/058958, mailed on Feb. 23, 2023, 21 pages.
Islam et al., "Measuring entanglement entropy in a quantum many-body system," Nature 528, Dec. 2015, 77-83.
Johri et al., "Entanglement spectroscopy on a quantum computer" CoRR, Submitted on Jul. 2017, arXiv:1707.07658v1, 7 pages.
Kandala et al., "Error mitigation extends the computational reach of a noisy quantum processor" Nature 567, Mar. 2019, 491-495.
Kitaev, "Quantum measurements and the abelian stabilizer problem," CoRR, Submitted on Nov. 1995, arXiv:quant-ph/9511026v1, 22 pages.
Kivlichan et al., "Quantum simulation of electronic structure with linear depth and connectivity" CoRR, Submitted on Feb. 2018, arXiv:1711.04789v2, 8 pages.
Knill, "Quantum Computing with Realistically Noisy Devices" Nature 434, Mar. 2005, 39-44.
Koczor, "Exponential error suppression for Near-Term quantum devices" CoRR, Submitted on Nov. 2020, arXiv:2011.05942v1, 21 pages.
Krantz et al., "A quantum engineer's guide to superconducting qubits" Applied Physics Reviews 6, Jun. 2019, 021318-1-57.
Litinski, "A Game of Surface Codes: Large-Scale Quantum Computing with Lattice Surgery," Quantum 3, 128, Mar. 2019, 37 pages.
Maciejewski et al., "Mitigation of readout noise in near-term quantum devices by classical post-processing based on detector tomography" Quantum 4, 257, Apr. 2020, 23 pages.
McArdle et al., "Error Mitigated digital quantum simulation" Phys. Rev. Lett. 122, May 2019, 180501-6.
McClean et al., "Decoding quantum errors with subspace expansions" Nat. Commun. 11, 636, Jan. 2020, 9 pages.
McClean et al., "Hybrid quantum-classical hierarchy for mitigation of decoherence and determination of excited states" Phys. Rev. A 95, 042308, Apr. 2017, 11 pages.
O'Brien et al., "Error mitigation via verified phase estimation" CoRR, Submitted on Oct. 2020, arXiv:2010.02538v1, 25 pages.
O'Gorman et al., "Generalized swap networks for near-term quantum computing." CoRR, Submitted on May 2019, arXiv:1905.05118v1, 16 pages.
Orus, "A practical introduction to tensor networks: Matrix product states and projected entangled pair states" CoRR, Submitted on Jun. 2013, arXiv:1306.2164v1, 50 pages.

(56) References Cited

OTHER PUBLICATIONS

Ouyang et al., "Compilation by stochastic Hamiltonian sparsification" Quantum 4, 235, Feb. 2020, 17 pages.
Peres, "Error symmetrization in quantum computers" CoRR, Submitted on May 1996, arXiv:quant-ph/9605009v1, 3 pages.
Perturbation theory for linear operators, Springer Science & Business Media, Jun. 2013, 643 pages.
Preskill, "Lecture notes for physics 229: Quantum information and computation" California Insitute of Technology, Sep. 1998, 321 pages.
Preskill, "Quantum computing in the NISQ era and beyond" Quantum 2, 79, Aug. 2018, 20 pages.
Sagastizabal et al., Experimental error mitigation via symmetry verification in a variational quantum eigensolver Phys. Rev. A 100, Jul. 2019, 010302:1-6.
Strikis et al., "Learning-based quantum error mitigation" CoRR, Submitted on Mar. 2021, arXiv:2005.07601v2, 28 pages.
Subasi et al., "Entanglement spectroscopy with a depth-two quantum circuit" CoRR, Submitted on Jun. 2018, arXiv:1806.08863v1, 7 pages.
Temme et al., "Error mitigation for Short-Depth quantum circuits" CoRR, Submitted on Nov. 2017, arXiv:1612.02058v3, 15 pages.
Tran et al., "Faster Digital Quantum Simulation by Symmetry Protection" CoRR, Submitted on Jun. 2020, arXiv:2006.16248v1, 25 pages.
Wang et al., "Threshold error rates for the toric and surface codes" CoRR, Submitted on May 2009, arXiv:0905.0531v1, 14 pages.
Office Action in Australian Appln. No. 2021379675, mailed on Oct. 18, 2023, 3 pages.
Office Action in Australian Appln. No. 2021379675, mailed on Sep. 26, 2024, 3 pages.
Office Action in Canada Appln. No. 3,198,490, mailed on Oct. 8, 2024, 4 pages.
Office Action in Japanese Appln. No. 2023-528316, mailed on Jul. 16, 2024, 13 pages (with English translation).

\* cited by examiner

VIRTUAL DISTILLATION FOR QUANTUM ERROR MITIGATION

CROSS-REFERENCE TO RELATED APPLICATIONS

This application is a National Stage Application under 35 U.S.C. § 371 and claims the benefit of International Application No. PCT/US2021/058958, filed Nov. 11, 2021, which claims the benefit of priority to U.S. Provisional Patent Application No. 63/112,593, filed on Nov. 11, 2020, the entirety of which is incorporated herein by reference.

BACKGROUND

This specification relates to quantum computing.

Quantum error correction codes are used in quantum computing to protect quantum information from errors due to decoherence and other quantum noise. Quantum error correction codes spread information encoded in one logical qubit onto a highly entangled state of several physical qubits. For example, the Shor code is a quantum error correction code that can correct phase flip and bit flip errors using a 9 qubit circuit that requires 8 ancillary qubits to correct 1 qubit.

SUMMARY

This specification describes techniques for mitigating errors in noisy quantum computations using virtual quantum state distillation.

In general, one innovative aspect of the subject matter described in this specification can be implemented in methods for determining an error-mitigated expectation value of a target observable with respect to a noisy quantum state, the methods including: obtaining multiple copies of the noisy quantum state; performing measurements on tensor products of M copies of the noisy quantum state to compute an expectation value of the target observable with respect to an entangled quantum state, wherein $M \geq 1$ and eigenvalues corresponding to non-dominant eigenvectors of the noisy quantum state in the spectral decomposition of the entangled quantum state are suppressed exponentially in M; and using the computed expectation value of the target observable with respect to an entangled quantum state to determine the error-mitigated expectation value of the target observable with respect to the noisy quantum state.

Other implementations of this aspect include corresponding classical and quantum computer systems, apparatus, and computer programs recorded on one or more computer storage devices, each configured to perform the actions of the methods. A system of one or more quantum and classical computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations noise experienced by each copy of the noisy quantum state comprises a same form and strength.

In some implementations the entangled quantum state is given by $\rho^M/\text{Tr}(\rho^M)$, wherein $\rho$ represents the noisy quantum state.

In some implementations the method further comprises performing measurements on tensor products of M copies of the noisy quantum state to compute an expectation value of the identity operator with respect to an entangled quantum state, wherein using the computed expectation value of the target observable with respect to the entangled quantum state to determine the error-mitigated expectation value of the target observable with respect to the noisy quantum state comprises dividing i) the expectation value of the target observable with respect to the entangled quantum state by ii) the expectation value of the identity operator with respect to an entangled quantum state.

In some implementations wherein performing measurements on tensor products of M copies of the noisy quantum state to compute expectation values of the target observable with respect to an entangled quantum state comprises: for each of a first number of measurement repetitions, measuring a product of i) the target observable and ii) a cyclic shift operator with respect to a tensor product of M copies of the noisy quantum state to obtain a first measurement outcome; computing, using the first measurement outcomes, an expectation value of the product of i) the target observable and ii) a cyclic shift operator with respect to the tensor product of M copies of the noisy quantum state; and normalizing the expectation value of the product of i) the target observable and ii) a cyclic shift operator with respect to the tensor product of M copies of the noisy quantum state to obtain the error-mitigated expectation value of the target observable with respect to the noisy quantum state.

In some implementations normalizing the expectation value of the target observable comprises: for each of a second number of measurement repetitions, measuring the cyclic shift operator with respect to a tensor product of M copies of the noisy quantum state to obtain a second measurement outcome; computing, using the second measurement outcomes, an expectation value of the cyclic shift operator with respect to a tensor product of M copies of the noisy quantum state; and dividing the expectation value of the product of i) the target observable and ii) a cyclic shift operator with respect to the tensor product of M copies of the noisy quantum state by the expectation value of the cyclic shift operator with respect to the tensor product of M copies of the noisy quantum state.

In some implementations performing measurements on tensor products of M copies of the noisy quantum state comprises performing parallel measurements.

In some implementations $M \geq 2$ and the target observable acts on a single qubit.

In some implementations performing measurements on tensor products of M copies of the noisy quantum state comprises, for each of K measurement repetitions: applying a diagonalization operator to a tensor product of M copies of the noisy quantum state to obtain an evolved quantum state, wherein the diagonalization operator diagonalizes i) a cyclic shift operator and ii) a product of a symmetrized version of the target observable and the cyclic shift operator, and measuring a product of the target observable and the cyclic shift operator with respect to the evolved quantum state to obtain a respective measurement outcome for each qubit in the evolved quantum state.

In some implementations the method further comprises computing an expectation value of the product of the target observable and the cyclic shift operator with respect to the evolved quantum state using the measurement outcomes;

computing an expectation value of the cyclic shift operator with respect to the evolved quantum state using the measurement outcomes; and dividing the expectation value of the product of the target observable and the cyclic shift operator with respect to the evolved quantum state by the expectation value of the cyclic shift operator with respect to the evolved quantum state.

In some implementations application of the cyclic shift operator couples qubits in a first copy of the noisy quantum state to corresponding qubits in each other copy of the noisy quantum state.

In some implementations performing measurements on tensor products of M copies of the noisy quantum state comprises performing serial measurements.

In some implementations $M \geq 2$ and the target observable acts on two or more qubits, the target observable comprising multiple tensor products of one-qubit operators.

In some implementations performing measurements on tensor products of M copies of the noisy quantum state comprises: for each tensor product of one-qubit operators: for each of a first number of measurement repetitions: applying a first diagonalization operator to a tensor product of the M copies of the noisy quantum state to obtain an evolved quantum state, wherein the first diagonalization operator diagonalizes a product of i) the tensor product of one-qubit operators and ii) the cyclic shift operator, and measuring a product of the tensor product of one-qubit operators and the cyclic shift operator with respect to the evolved quantum state to obtain a respective first measurement outcome for each qubit in the evolved quantum state; for each of a second number of measurement repetitions: applying a second diagonalization operator to a tensor product of the M copies of the noisy quantum state to obtain a second evolved quantum state, wherein the second diagonalization operator diagonalizes the cyclic shift operator, and measuring the cyclic shift operator with respect to the second evolved quantum state to obtain a respective second measurement outcome for each qubit in the second evolved quantum state.

In some implementations the method further comprises computing an expectation value of a product of the target observable and the cyclic shift operator using the first measurement outcomes; computing an expectation value of the cyclic shift operator using the second measurement outcomes; and dividing the expectation value of the product of the target observable and the cyclic shift operator by the expectation value of the cyclic shift operator.

In some implementations performing measurements on tensor products of M copies of the noisy quantum state to compute an expectation value of the target observable with respect to an entangled quantum state comprise performing ancilla-assisted measurements.

In some implementations the target observable comprises an arbitrary observable.

In some implementations $M \geq 2$ and performing ancilla assisted measurements comprises, for each of multiple measurement repetitions: preparing two quantum registers, where each quantum register comprises the noisy quantum state and an ancilla qubit prepared in the 0 state; performing a non-destructive measurement of a cyclic shift operator, comprising: applying a Hadamard gate to the ancilla qubit, applying a the cyclic shift operator to the two quantum registers conditioned on the ancilla qubit being in the 1 state, and measuring the ancilla qubit in the X basis to obtain a first respective measurement outcome; and measuring qubits in the two quantum registers with respect to a symmetrized version of the target observable to obtain respective second measurement outcomes.

In some implementations the method further comprises computing an expectation value of the target observable using the second measurement outcomes; and computing an expectation value of the cyclic shift operator using the first measurement outcomes; and dividing the expectation value of the target observable by the expectation value of the cyclic shift operator.

The subject matter described in this specification can be implemented in particular ways so as to realize one or more of the following advantages.

Performing meaningful calculations using near-term quantum computers can be challenging because of the relatively high error rates of these devices. While quantum error correction promises to enable quantum computation with arbitrarily small levels of noise, the computational overhead incurred is too large to be currently practical. The presently described error mitigation technique enhances the quality of a noisy computation without the large overhead of traditional quantum error correction. The error mitigation strategy is capable of reducing the impact of stochastic errors arising from noise, e.g., on a near-term device, as well as stochastic errors inherent to randomized quantum algorithms implemented on an error-free device. In addition, since the error mitigation strategy is particularly suited to implementations on near term devices, e.g., NISQ devices, the error mitigation strategy can be applied in a wide range of technical applications, including simulations of molecules and materials, optimization processes, and quantum neural networks.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
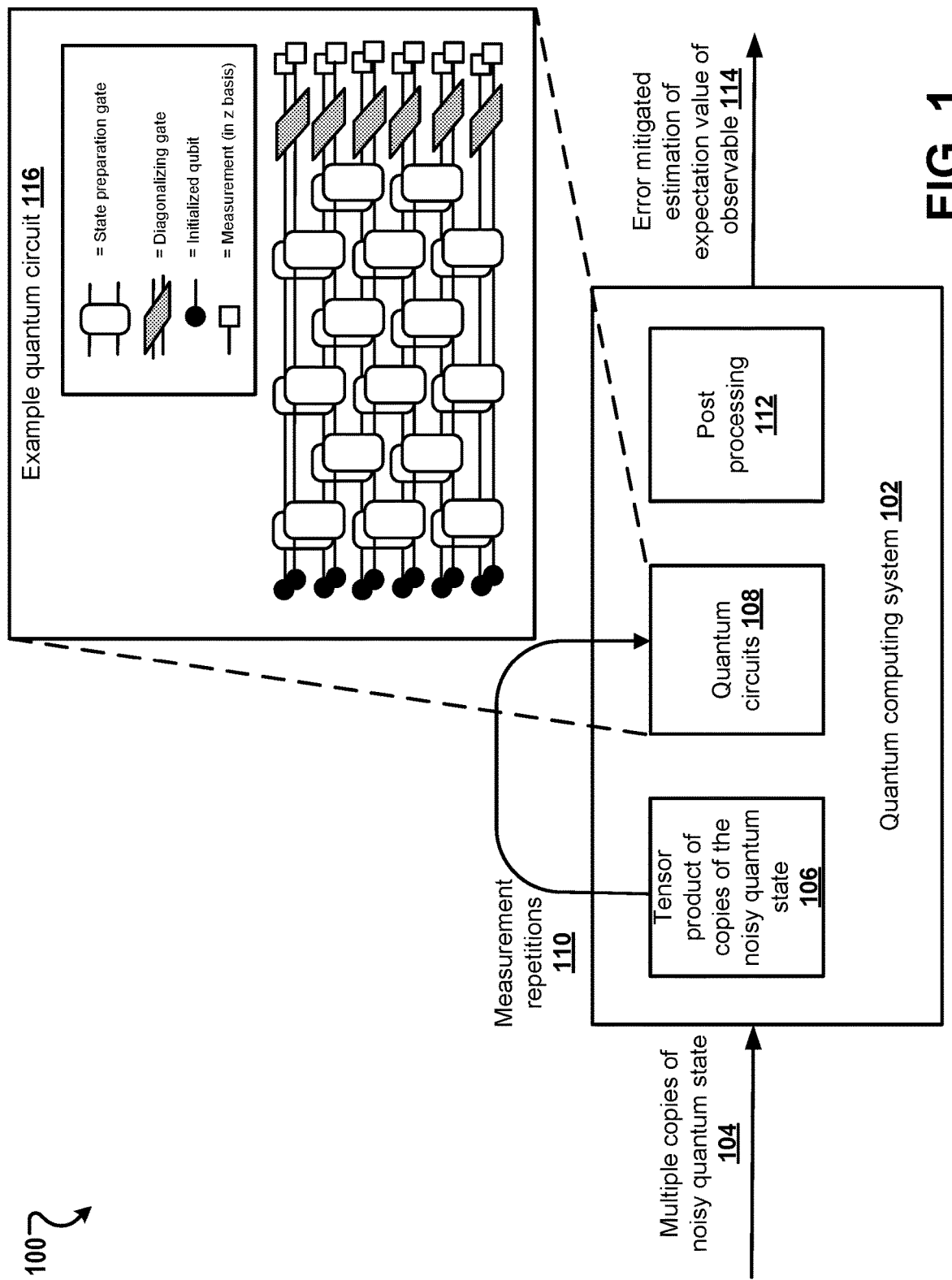
FIG. 1 shows a block diagram of an example system performing virtual distillation to mitigate errors when calculating an expectation value of an observable with respect to a noisy quantum state.

This specification describes techniques for mitigating errors in a noisy quantum computation. In particular, the presently described techniques enable an efficient approximation of a computational output that would be produced in the absence of noise. Expectation values of an observable with respect to an approximately purified version of a noisy quantum state are reconstructed without explicitly preparing the purified quantum state. This approach is referred to herein as "virtual distillation," where the word "virtual" is used to emphasize that the purified version of the quantum state is not actually prepared (as in conventional distillation schemes.) More specifically, collective measurements of M copies of the noisy quantum state ρ are used to measure expectation values of an observable with respect to an entangled quantum state represented as:

$$\frac{\rho^M}{Tr(\rho^M)} = \frac{\sum_i p_i^M |i\rangle\langle i|}{\sum_i p_i^M}, \qquad (1)$$

where $\rho = \Sigma_i \rho_i |i\rangle \langle i|$ is a spectral decomposition (e.g. density matrix) of the noisy quantum state ρ and Tr denotes the trace operation. Under this approach, the relative weights $\rho_i^M$ of the non-dominant eigenvectors are suppressed exponentially in M. This represents an improvement over other approaches that demand that the approximately purified state is prepared explicitly, which achieve a suppression that is only linear in M in the general case. Accordingly, virtual distillation approximates a corrected expectation value (e.g., an expectation value where incoherent errors have been suppressed) of the observable O as a trace of a product of the observable and M copies of the spectral decomposition of the noisy quantum state, divided by a trace of M copies of the spectral decomposition of the noisy quantum state, e.g.

$$\langle O \rangle_{corrected} := \frac{Tr(O\rho^M)}{Tr(\rho^M)}. \qquad (2)$$

The resulting estimator converges exponentially quickly towards the closest pure state to ρ as M is increased. This is in contrast to other approaches that only achieve a linear convergence to a corrected state. The presently described techniques therefore provide a technical improvement over these other approaches, since the corrected state can be obtained in less time.

In this specification the operations described are operations that act on multiple copies of the same noisy state. It is assumed that the noise experienced by the separate copies has the same form and strength. If this assumption is relaxed, then an effective state that corresponds to the product of the density matrices of the individual copies is still measured so long as the copies are not entangled prior to virtual distillation. The letter N indicates the number of qubits in an individual system and the letter M indicates the number of copies (which is sometimes referred to as subsystems). Superscripts with parentheses indicate an operator that acts on multiple systems. For example, the cyclic shift operator between M copies is denoted by $S^{(M)}$. Bolded superscripts without parentheses denote which copy an operator/observable acts on, e.g., $O^1$ indicates the observable O acting on subsystem 1. Superscripts without a bold-faced font or parentheses indicate exponentiation as usual. Subscripts on an operator generally indicate which qubit within a system the operator acts on. The exception is when the subscript is being used more generically as an index in a summation, which to the skilled person will be clear from the context and the presence of the Σ symbol.

Example Operating Environment

FIG. 1 shows a block diagram 100 of an example system performing virtual distillation to mitigate errors when calculating an expectation value of an observable with respect to a noisy quantum state. A quantum computing system 102 obtains multiple copies of a noisy quantum state 104. For example, the quantum computing system 102 can include a quantum computer that is performing a quantum computation. Part of the quantum computation can include measuring an output quantum state to determine properties of the quantum state, e.g., an expectation value of a target observable, and obtain a result of the quantum computation. In the absence of noise, the output quantum state would be error-free. Therefore, an error-free expectation value could be obtained through repeated preparation and measurement of the output quantum state. However, realistically the quantum computation performed by the quantum computer is likely to be a noisy quantum computation, e.g., in cases where the quantum computer is a NISQ device. Therefore, the output quantum state is typically a noisy quantum state and an expectation value obtained through repeated preparation and measurement of the output quantum state will be noisy. The quantum computer must therefore correct the expectation value in order to obtain a more accurate and meaningful result of the quantum computation.

To compute a corrected expectation value the quantum computer performs collective measurements on M copies of the noisy quantum state ρ to determine expectation values of the target observable with respect to the entangled quantum state given by Equation (1) above. That is, the quantum computer determines the expectation value given by Equation (2) above.

In order to compute the numerator and denominator of Equation (2), the following equality is used $$Tr(O\rho^M) = Tr(O^i S^{(M)} \rho^{\otimes M}). \qquad (3)$$

In Equation (3), $O^i$ indicates the observable O acting on (an arbitrary) subsystem i and $S^{(M)}$ indicates the cyclic shift operator on M systems, i.e., $$O^i := \mathbb{I} \otimes \mathbb{I} \ldots O \ldots \mathbb{I}, S^{(M)} |\psi_1\rangle$$
$$\otimes |\psi_2\rangle \ldots |\psi_M\rangle := |\psi_2\rangle \otimes |\psi_3\rangle \ldots |\psi_1\rangle \qquad (4)$$

This identity can be proven by expanding the right-hand side, keeping track of the indices. Without loss of generality the index i can be chosen to equal 1, yielding $$Tr(O^1 S^{(M)} \rho^{\otimes M}) = \sum_{i_1, i_2, \ldots, i_M, j_1, j_2, \ldots, j_M, k} O_{k, j_1} \delta_{j_2, i_1} \cdots \delta_{j_1, i_M} \qquad (5)$$
$$\rho_{i_1, k} \cdots \rho_{i_M, j_M}$$
$$= \sum_{i_1, i_2, \ldots, i_M, k} \rho_{i_1, k} O_{k, i_M} \rho_{i_M, i_{M-1}} \cdots \rho_{i_2, i_1}$$
$$= Tr(O\rho^M)$$

Setting O as equal to the identity operator $\mathbb{I}$ gives an equivalent expression for the denominator of Equation (2), i.e., $Tr(S^{(M)} \rho^{\otimes M}) = Tr(\rho^M)$.

Therefore, to compute the numerator and denominator of Equation (2) the quantum computer is configured to perform operations to compute the quantities $Tr(O^1 S^{(M)} \rho^{\otimes M})$ and $Tr(S^{(M)} \rho^{\otimes M})$. These operations include preparing a tensor product 106 of M copies of the noisy quantum state, i.e., the state $\rho^{\otimes M}$ and applying a quantum circuit 108 to the tensor product 106, e.g., a quantum circuit designed to implement a measurement of a product of the target observable and the cyclic shift operator $OS^{(M)}$ with respect to the tensor product 106 or a quantum circuit designed to implement a measurement of the cyclic shift operator with respect to the tensor product 106. After multiple measurement repetitions 110, the quantum computer can post process 112 the obtained measurement outcomes to determine an expectation value of a product of the target observable and the cyclic shift operator with respect to the tensor product of M copies of the noisy quantum state, i.e. $\mathrm{Tr}(O^1 S^{(M)} \rho^{\otimes M})$, and a corresponding normalization factor, i.e. $\mathrm{Tr}(S^{(M)} \rho^{\otimes M})$. The normalization factor may correspond to the expectation value of the identity operator with respect to an entangled quantum state. The error mitigated estimation of the expectation value of the observable 114 can be obtained by dividing the expectation value o of a product of the target observable and the cyclic shift operator with respect to the tensor product of M copies of the noisy quantum state by the normalization factor, as given by Equation (2).

As discussed above, the quantum circuits 108 that the quantum computer applies to the tensor products 106 include gates that either diagonalize or represent the cyclic shift operator $S^{(M)}$. In some implementations the quantum circuits 108 can include additional quantum gates to optimize the evaluation of the numerator and denominator of Equation (2). For example, in example quantum circuit 116 the quantum circuit further includes a single layer of two-qubit diagonalizing gates 118 which can be applied in parallel, as described in more detail below with reference to FIG. 5. Generally, the quantum circuits 108 can vary depending on various factors such as the number of copies of the noisy state included in the tensor product 106, the type of target observable, e.g., whether the target observable is a single qubit operator or multi-qubit operator, and whether additional quantum computing resources are available to the quantum computer, e.g., whether ancilla-assisted measurement is feasible in the experimental setup. Variants of virtual distillation are described in more detail below with reference to FIG. 5.

Figure 2:
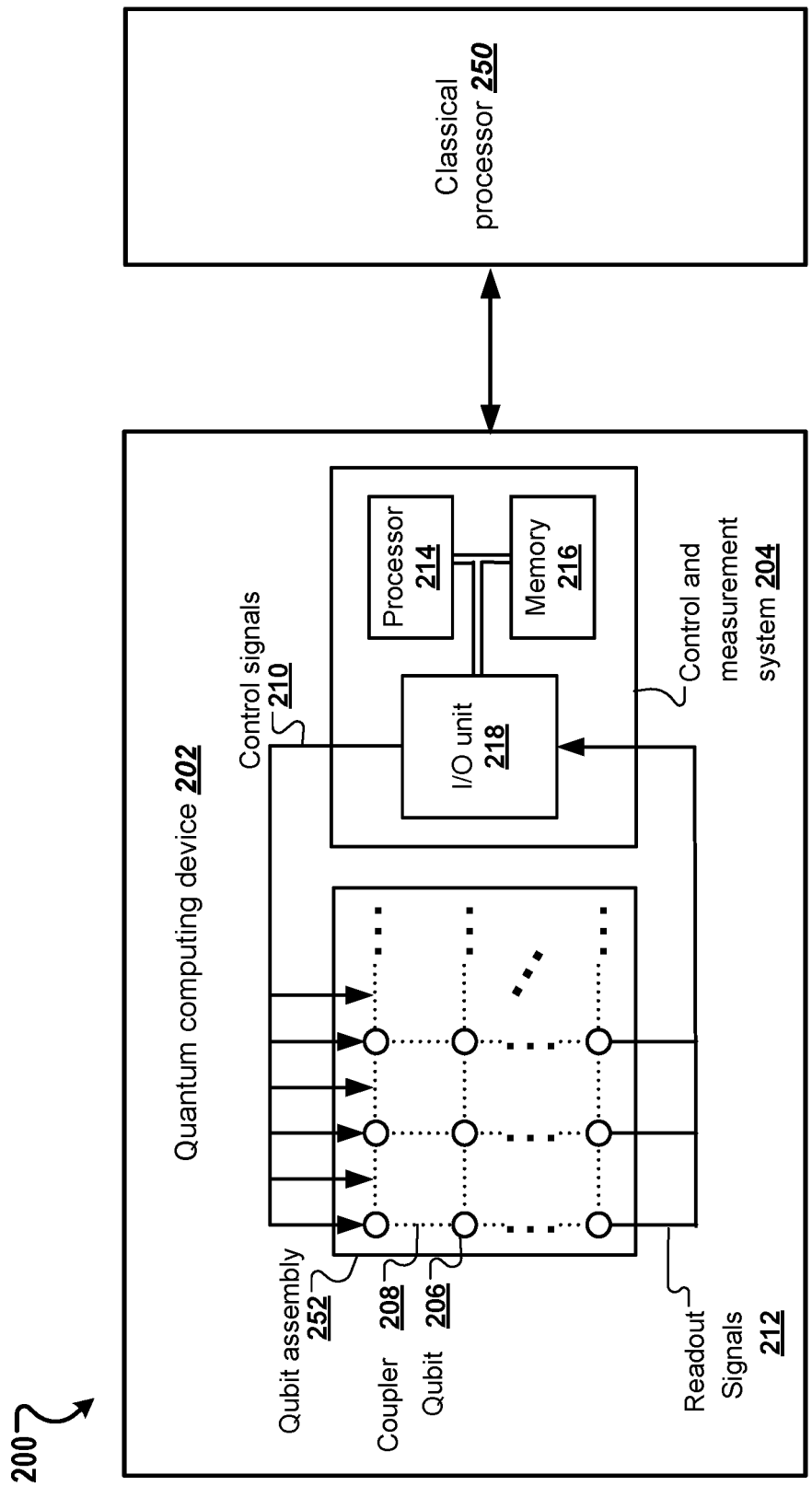
FIG. 2 shows an example quantum computing system.

FIG. 2 depicts an example quantum computing system 200 for performing virtual distillation to mitigate errors when calculating an expectation value of an observable with respect to a noisy quantum state. The example quantum computing system 200 is an example of a system implemented as classical and quantum computer programs on one or more classical computers and quantum computing devices in one or more locations, in which the systems, components, and techniques described herein can be implemented.

The example quantum computing system 200 includes a quantum computing device 202. The quantum computing device 202 can be used to perform the quantum computation operations described in this specification according to some implementations. The quantum computing device 202 is intended to represent various forms of quantum computing devices. In some implementations the quantum computing device 202 is a noisy quantum computing device, e.g., a NISQ device. The components shown here, their connections and relationships, and their functions, are exemplary only, and do not limit implementations of the inventions described and/or claimed in this specification.

The example quantum computing device 202 includes a qubit assembly 252 and a control and measurement system 204. The qubit assembly includes multiple qubits, e.g., qubit 206, that are used to perform algorithmic operations or quantum computations. While the qubits shown in FIG. 2 are arranged in a rectangular array, this is a schematic depiction and is not intended to be limiting. The qubit assembly 252 also includes adjustable coupling elements, e.g., coupler 208, that allow for interactions between coupled qubits. In the schematic depiction of FIG. 2, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device included in example system 200 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by preparing the qubits in an initial state, e.g., resetting each qubit or performing quantum operations on the qubits to obtain a target quantum state, and applying a sequence of unitary operators to the initial state. Applying a unitary operator to a quantum state can include applying a corresponding sequence of quantum logic gates to the qubits. Example quantum logic gates include single-qubit gates, e.g., Pauli-X, Pauli-Y, Pauli-Z (also referred to as X, Y, Z), Hadamard and S gates, two-qubit gates, e.g., SWAP gates, controlled-X, controlled-Y, controlled-Z (also referred to as CX, CY, CZ), and gates involving three or more qubits, e.g., Toffoli gates. The quantum logic gates can be implemented by applying control signals 210 generated by the control and measurement system 204 to the qubits and to the couplers.

For example, in some implementations the qubits in the qubit assembly 252 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 210 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 210. The measurements cause readout signals 212 representing measurement results to be communicated back to the measurement and control system 204. The readout signals 212 may include RF, microwave, or optical signals depending on the physical scheme for the quantum computing device and/or the qubits. For convenience, the control signals 210 and readout signals 212 shown in FIG. 2 are depicted as addressing only selected elements of the qubit assembly (i.e. the top and bottom rows), but during operation the control signals 210 and readout signals 212 can address each element in the qubit assembly 252.

The control and measurement system 204 is an example of a classical computer system that can be used to perform various operations on the qubit assembly 252, as described above, as well as other classical subroutines or computations. The control and measurement system 204 includes one or more classical processors, e.g., classical processor 214, one or more memories, e.g., memory 216, and one or more I/O units, e.g., I/O unit 218, connected by one or more data buses. The control and measurement system 204 can be programmed to send sequences of control signals 210 to the qubit assembly, e.g. to carry out a selected series of quantum gate operations, and to receive sequences of readout signals 212 from the qubit assembly, e.g. as part of performing measurement operations.

The processor 214 is configured to process instructions for execution within the control and measurement system 204. In some implementations, the processor 214 is a single-threaded processor. In other implementations, the processor 214 is a multi-threaded processor. The processor 214 is capable of processing instructions stored in the memory 216.

The memory 216 stores information within the control and measurement system 204. In some implementations, the memory 216 includes a computer-readable medium, a volatile memory unit, and/or a non-volatile memory unit. In some cases, the memory 216 can include storage devices capable of providing mass storage for the system 204, e.g. a hard disk device, an optical disk device, a storage device that is shared over a network by multiple computing devices (e.g., a cloud storage device), and/or some other large capacity storage device.

The input/output device 218 provides input/output operations for the control and measurement system 204. The input/output device 218 can include D/A converters, A/D converters, and RF/microwave/optical signal generators, transmitters, and receivers, whereby to send control signals 210 to and receive readout signals 212 from the qubit assembly, as appropriate for the physical scheme for the quantum computer. In some implementations, the input/output device 218 can also include one or more network interface devices, e.g., an Ethernet card, a serial communication device, e.g., an RS-232 port, and/or a wireless interface device, e.g., an 802.11 card. In some implementations, the input/output device 218 can include driver devices configured to receive input data and send output data to other external devices, e.g., keyboard, printer and display devices.

Although an example control and measurement system 204 has been depicted in FIG. 2, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The example system 200 further includes an example classical processor 250. The classical processor 250 can be used to perform classical computation operations described in this specification according to some implementations. In FIG. 2 the classical processor 250 is shown as separate to the quantum computing device 202, however in some implementations the classical processor 250 can be included in the quantum computing device 202, e.g., in the processor 214.

Programming the Hardware: Virtual Distillation

Figure 3:
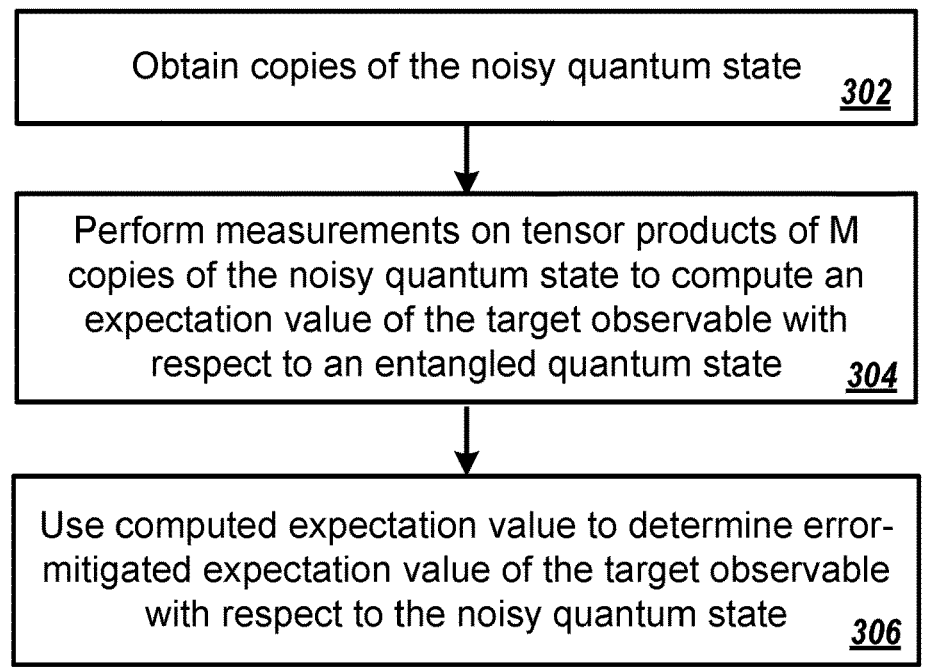
FIG. 3 is a flowchart of an example process for determining an error-mitigated expectation value of a target observable with respect to a noisy quantum state.

FIG. 3 is a flowchart of an example process 300 for determining an error-mitigated expectation value ⟩O⟨ corrected of a target observable O with respect to a noisy quantum state p. For convenience, the process 300 will be described as being performed by a system of one or more classical and quantum computing devices located in one or more locations. For example, the quantum computing device 200 of FIG. 2, appropriately programmed in accordance with this specification, can perform the process 300.

The system obtains multiple of the noisy quantum state $\rho$ (step 302). For example, the system can perform quantum computations to prepare the copies of the noisy quantum state or retrieve the copies of the noisy quantum state from a quantum memory. In some implementations the noise experienced by each copy of the noisy quantum state has a same form and strength. The number of copies can be chosen based on a variety of factors including the capabilities of the quantum device performing the process 300, the type of target observable, and/or a target accuracy of the output error-mitigated expectation value.

The system performs measurements on tensor products of $M \geq 1$ copies of the noisy quantum state, e.g., $\rho^{\otimes M}$ to compute an expectation value of the target observable with respect to an entangled quantum state (step 304). For example, the system computes $Tr(O^i S^{(M)} \rho^{\otimes M})$ as given by Equation (3) above. The entangled quantum state is a quantum state where eigenvalues corresponding to non-dominant eigenvectors of the noisy quantum state in the spectral decomposition of the entangled quantum state are suppressed exponentially in M. For example, the entangled quantum state can be the quantum state $\rho^M$ given by Equation (1) above.

To perform the measurements, the system can, for each of a first number of measurement repetitions, measure a product of i) the target observable and ii) a cyclic shift operator (e.g., measure $O^i S^{(M)}$) with respect to a tensor product of M copies of the noisy quantum state $\rho^{\otimes M}$ to obtain a first measurement outcome. The system can then use the first measurement outcomes to compute the expectation value of the product of the target observable and the cyclic shift operator with respect to $\rho^{\otimes M}$, e.g., compute $Tr(O^i S^{(M)} \rho^{\otimes M})$.

As described above with reference to Equation (3), the expectation value of the product of the target observable and the cyclic shift operator with respect to $\rho^{\otimes M}$ is equal to the expectation value of the target observable with respect to the entangled quantum state. Therefore, at step 304 the system computes the expectation value of the target observable with respect to the entangled quantum state without having to explicitly prepare the entangled quantum state.

The system uses the computed expectation value of the product of the target observable and the cyclic shift operator with respect to $\rho^{\otimes M}$ to determine the error-mitigated expectation value of the target observable with respect to the noisy quantum state (step 306). For example, the system can normalize the expectation value of the product of the target observable and the cyclic shift operator with respect to $\rho^{\otimes M}$ by dividing the expectation value by an expectation value of the cyclic shift operator with respect to $\rho^{\otimes M}$. The normalized expectation value provides an approximation to the error-mitigated expectation value of the target observable with respect to the noisy quantum state, as described above with reference to Equations (1)-(3).

To compute the expectation value of the cyclic shift operator with respect to $\rho^{\otimes M}$ the system performs a similar process to that described at step 304, where the observable is set to equal the identity operator. That is, for each of a second number of measurement repetitions, the system measures the cyclic shift operator with respect to a tensor product of M copies of the noisy quantum state ($\rho^{\otimes M}$) to obtain a second measurement outcome. The system can then use the second measurement outcomes to compute the expectation value of the cyclic shift operator with respect to the quantum state $\rho^{\otimes M}$, e.g., $Tr(S^{(M)}\rho^{\otimes M})$.

Example process 300 describes a general application of virtual distillation. However, in some implementations the quantities in the numerator and denominator of Equation 2 can be evaluated in a number of different ways. For example, in some implementations steps of the process can be combined and/or implemented in parallel. Example variations of example process 300 are described in detail below with reference to FIG. 5.

Figure 4:
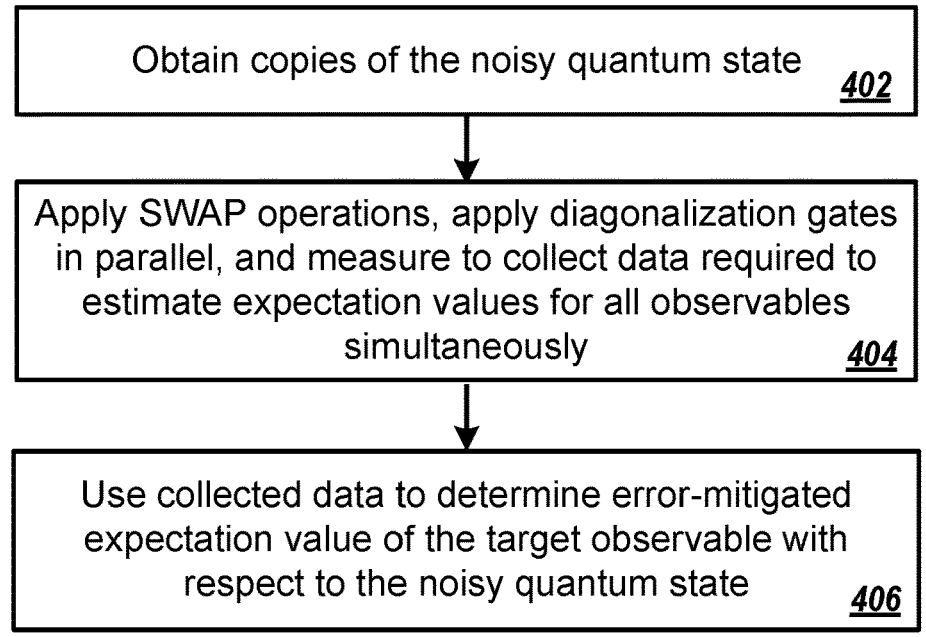
FIG. 4 is a flowchart of an example process for performing virtual distillation with measurement by diagonalization.

Programming the Hardware: Virtual Distillation with Measurement by Diagonalization FIG. 4 is a flowchart of an example process 400 for performing virtual distillation with measurement by diagonalization. For convenience, the process 400 will be described as being performed by a system of one or more classical and quantum computing devices located in one or more locations. For example, the quantum computing device 200 of FIG. 2, appropriately programmed in accordance with this specification, can perform the process 400.

Example process 400 is particularly suitable for implementations where M=2 and the target observable O acts on a single qubit. For convenience, example process 400 is described for the case where the target observable O is a Pauli-Z operator acting on a single qubit. However, example process 400 can also be applied to other single-qubit observables, e.g., by applying appropriate single-qubit rotations before the virtual distillation procedure. For example, the Pauli-X operator can be measured using the procedure for measuring a Pauli-Z operator after applying Hadamard gates to the appropriate qubit in each copy.

The system obtains multiple copies of the noisy quantum state $\rho$ (step 402). Step 402 is similar to step 302 of example process 300 and for brevity, details are not repeated.

The system performs measurements on tensor products of 2 copies of the noisy quantum state, e.g., $\rho^{\otimes 2}$ to compute an expectation value of the target observable with respect to an entangled quantum state. At step 304 of example process 300, the relation in Equation (3) was used to compute the required expectation values. In example process 400, rather than using the relation in Equation (3) directly, the system determines a symmetrized version of the target observable is instead defined $$O^{(M)} = \frac{1}{M}\sum_{i=1}^{M} O^i. \tag{6}$$

For the specific case that the target observable O is a Pauli-Z operator acting on a single qubit, this means that $$Z_k^{(2)} = \frac{1}{2}(Z_k^1 + Z_k^2). \tag{7}$$

Equation (3) can then be used to show that $$\frac{Tr(O\rho^M)}{Tr(\rho^M)} = \frac{Tr(O^{(M)}S^{(M)}\rho^{\otimes M})}{Tr(S^{(M)}\rho^{\otimes M})} \tag{8}$$

Using the symmetrized observable is advantageous because $$[O^{(M)}, S^{(M)}] = 0, \tag{9}$$

or in this case $[Z_k^{(2)}, S^{(2)}] = 0$.

Both $S^{(2)}$ and $Z_k^{(2)}$ (factorize into tensor products of operators that act separately on each pair of qubits, where the ith pair consists of the ith qubit from each system. Therefore, $S^{(2)}$ and $Z_k^{(2)}S^{(2)}$ can be simultaneously diagonalized using an operator that factorizes with the same structure. The two-qubit unitary that performs this diagonalization on the ith pair is denoted as $B_i^{(2)}$. A matrix representation for this gate is given below $$B_i^{(2)} := \begin{bmatrix} 1 & 0 & 0 & 0 \\ 0 & \frac{\sqrt{2}}{2} & -\frac{\sqrt{2}}{2} & 0 \\ 0 & \frac{\sqrt{2}}{2} & \frac{\sqrt{2}}{2} & 0 \\ 0 & 0 & 0 & 1 \end{bmatrix} \tag{10}$$

where the choice of phases for the matrix elements can vary. The operator $B^{(2)}$ can then be defined as $$B^{(2)} := \otimes_{i=1}^{M} B_i^{(2)}. \tag{11}$$

As desired, this unitary diagonalized the individual factors that make up the observables $$B^{(2)}S_i^{(2)}B^{(2)\dagger} \to \frac{1}{2}(1 + Z_i^1 - Z_i^2 + Z_i^1 Z_i^2), \tag{12}$$

$$B^{(2)}Z_k^{(2)}S_k^{(2)}B^{(2)\dagger} \to \frac{1}{2}(Z_k^1 + Z_k^2). \tag{13}$$

This diagonalization is particularly easy to implement when each qubit from the first copy of $\rho$ is adjacent to the corresponding qubit from the second copy.

The procedure for measuring the observables required to estimate the numerator and denominator of Equation (8) then reduces to applying a single layer of N two-qubit gates in parallel and measuring in the computational basis (step 404). In fact, because $B^{(2)}$ diagonalizes $Z_k^{(2)}S^{(2)}$ for all N values of k, the data required to estimate the error mitigated expectation values for all N of the operators $Z_k$ is collected simultaneously. By applying the appropriate single qubit rotations before performing virtual distillation, an arbitrary single-qubit observable on each qubit can be accessed.

In order to develop some intuition, it is helpful to express $\rho^{\otimes 2}$ using a spectral decomposition of $\rho$ and consider two separate components of the resulting sum, $$\rho^{\otimes 2} = \sum_{ij} p_i p_j |i\rangle\langle i| \otimes |j\rangle\langle j| \quad (14)$$

$$= \sum_i p_i^2 |i\rangle\langle i| \otimes |j\rangle\langle j| + \sum_{i \neq j} p_i p_j |i\rangle\langle i| \otimes |j\rangle\langle j|.$$

The calculation of measurement probabilities and expectation values is a linear operation on the density matrix; these two components can therefore be considered separately. The component of the state with i=j is in the +1 eigenspace of $S^{(2)}$ and leads to measurements of $S^{(2)}$ which yield the +1 eigenvalue with probability $\rho = \Sigma_i \rho_i^2 = \text{Tr}(\rho^2)$. In the case where i≠j, $|i\rangle\langle i| \otimes |j\rangle\langle j|$ is an even superposition of symmetric and anti-symmetric states, $$|i\rangle|j\rangle = \frac{1}{2}(|i\rangle|j\rangle + |j\rangle|i\rangle) + \frac{1}{2}(|i\rangle|j\rangle - |j\rangle|i\rangle). \quad (15)$$

For this component of the state, measurements of $S^{(2)}$ yield +1 and −1 with equal probability and $\langle S^{(2)} \rangle = 0$. Combining these two cases gives the expected equality $\text{Tr}(S^{(2)}\rho^{\otimes 2}) = \text{Tr}(\rho^2)$. Measurements of $S^{(2)}O^{(2)}$ follow a similar pattern.

It is interesting to contrast this behavior with the stabilizer theory of quantum error correction. In the stabilizer formalism, errors are detected by projecting through measurement into the −1 eigenspace of one or more symmetries. In the presently described approach, the errors are equally supported on the eigenspaces of the symmetry that is measured.

Returning to FIG. 4, to perform the measurements on the tensor products of 2 copies of the noisy quantum state to compute an expectation value of the target observable with respect to an entangled quantum state, for each of multiple measurement repetitions, the system applies a diagonalization operator to a tensor product of M copies of the noisy quantum state to obtain an evolved quantum state, where the diagonalization operator diagonalizes i) the cyclic shift operator and ii) a product of a symmetrized version of the target operator and the cyclic shift operator. The system then measures a product of the target observable and the cyclic shift operator with respect to the evolved quantum state to obtain a respective measurement outcome for each qubit in the two copies of the noisy quantum state.

The system then uses the measurement outcomes to compute the expectations values given by Equation (8), and in turn the error-mitigated expectation value of the target observable with respect to the noisy quantum state (step 406). For example, the system can compute an expectation value of the product of the target observable and the cyclic shift operator with respect to $\rho^{\otimes M}$ using the measurement outcomes, compute an expectation value of the cyclic shift operator with respect to $\rho^{\otimes M}$ using the measurement outcomes, divide the expectation value of the product of the target observable and the cyclic shift operator with respect to $\rho^{\otimes M}$ by the expectation value of the cyclic shift operator with respect to $t\rho^{\otimes M}$.

An example algorithm for performing virtual distillation with measurement by diagonalization with M=2 and $O=Z_i$ is given below:

---

Input: A number of measurement repetitions K, 2K copies of the N-qubit noisy quantum state ρ (provided two at a time).
Output: An error-mitigated estimate of $\langle Zi \rangle$ for each qubit in ρ;

$$\langle Z_i \rangle_{corrected} \approx \frac{Tr(Z_i \rho^2)}{Tr(\rho^2)}.$$

Set $E_i = 0$ for each qubit $i \in 1, \ldots, N$.
Set D = 0.
for $k \in K$ do
    Perform any SWAP operations necessary to make it possible to couple each qubit in the first copy of ρ with the corresponding qubit in the second copy.
    Apply the two-qubit gate $B_i^{(2)}$ defined in Equation (10) between each qubit i in the first copy and the corresponding qubit in the second copy.
    Measure both states in the computational basis.
    Let $z_i^1$ and $z_i^2$ denote the measurement outcomes for the ith qubits in the first and second copies of ρ respectively.
    for $i \in 1, \ldots, N$ do $$E_i \mathrel{+}= \frac{1}{2^N}(z_i^1 + z_i^2)\prod_{j \neq i}\left(1 + z_j^1 - z_j^2 + z_j^1 z_j^2\right)$$

end for $$D \mathrel{+}= \frac{1}{2^N}\prod_{j=1,\ldots,N}\left(1 + z_j^1 - z_j^2 + z_j^1 z_j^2\right)$$

end for
return $\{\langle Z_i \rangle_{corrected} := E_i/D\}$

---

Programming the Hardware: Selecting Different Virtual Distillation Protocols

Figure 5:
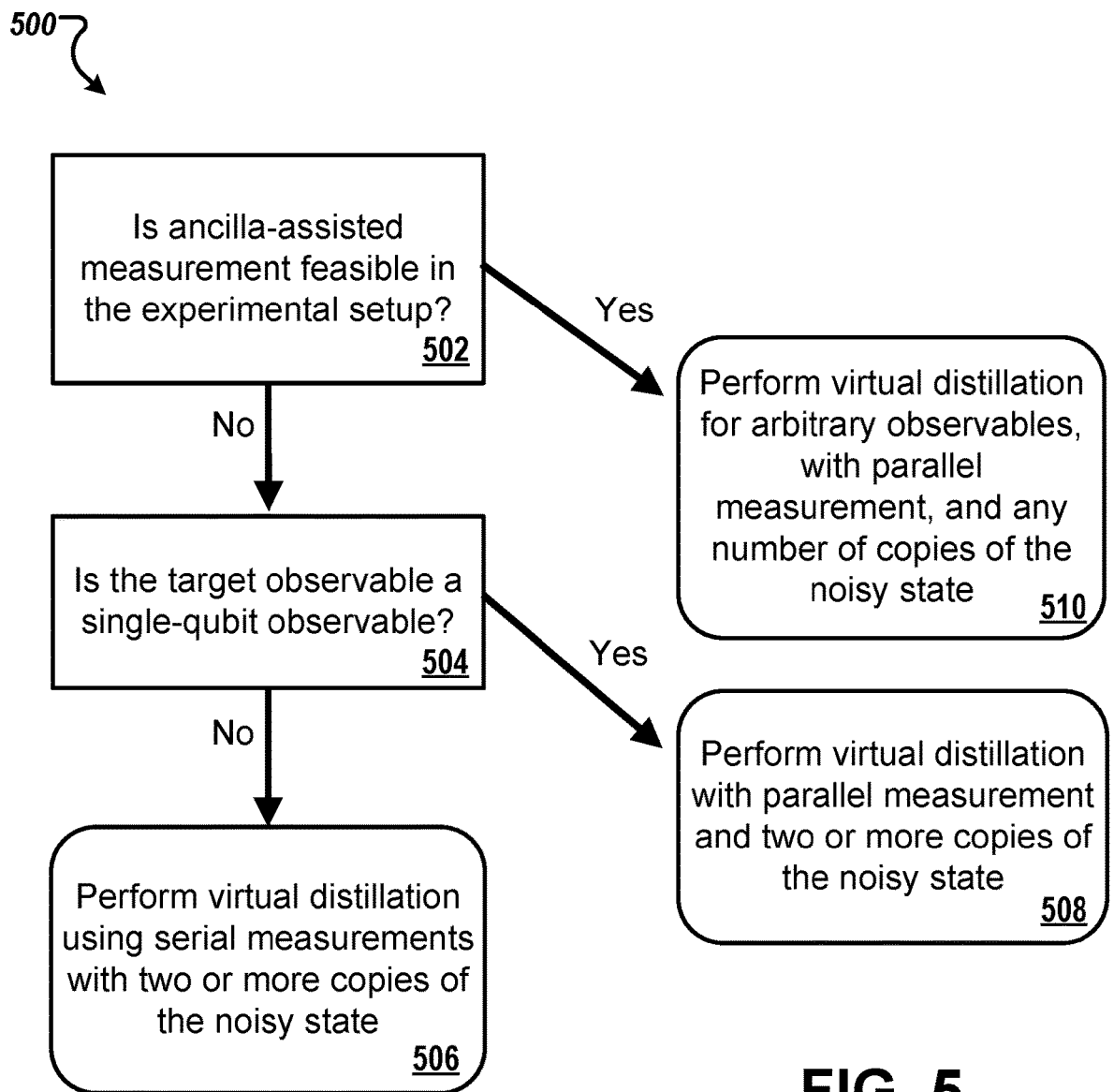
FIG. 5 is a flowchart of an example process for selecting a virtual distillation protocol.

FIG. 5 is a flowchart of an example process 500 for selecting a virtual distillation protocol. For convenience, the process 500 will be described as being performed by a system of one or more classical and quantum computing devices located in one or more locations. For example, the quantum computing device 200 of FIG. 2, appropriately programmed in accordance with this specification, can perform the process 500.

The system determines whether ancilla-assisted measurement is feasible in the available experimental setup (step 502). In response to determining that ancilla-assisted measurement is not feasible, the system determines whether the target observable is a single qubit observable or not (step 504). In response to determining that the target observable is not a single qubit observable, the system performs a virtual distillation protocol with serial measurements on two or more copies of the noisy quantum state (step 506).

Measuring observables with support on more than one qubit can be challenging. The challenge arises due to the use of Equation 8, in particular the choice to use the symmetrized version of an observable (defined in Equation 6.) Using the symmetrized version of a multi-qubit observable means that it is not possible to perform the required diagonalization using a tensor product of separate unitaries across each pair of qubits. As an example, consider the observable $O=Z_i Z_j$ (the analysis is equally valid for any other operator composed of a tensor product of (more than one) single-qubit Pauli operators.) Taking the product of the symmetrized observable and the swap operator for M=2 yields $$O^{(2)}S^{(2)} = \frac{1}{2}(Z_i^1 Z_j^1 + Z_i^2 Z_j^2)S^{(2)}. \quad (16)$$

This operator does not factorize into a tensor product of operators with support on the individual pairs of qubits, nor can it be diagonalized by an operator that factors this way.

However, instead of using Equation (8) to determine the corrected expectation value of O, the non-symmetrized form introduced in Equation (2) can be used. Returning to the example where $O=Z_iZ_j$, the task is that the numerator and denominator of the below equation is to be computed:

$$\frac{Tr(Z_i^1 Z_j^1 S^{(2)} \rho^{\otimes 2})}{Tr(S^{(2)} \rho^{\otimes 2})}. \tag{17}$$

Unlike the symmetrized observable of Equation (16), the operator $Z_i^1 Z_j^1 S^{(2)}$ factorizes into a tensor product over the N pairs of qubits (a pair being one qubit from the first system and the corresponding qubit from the second system). $Z_i^1 Z_j^1 S^{(2)}$ is not Hermitian, but because it is unitary, the quantity $Tr(Z_i^1 Z_j^1 S^{(2)})\rho^{\otimes 2})$ can be estimated by applying a circuit to diagonalize it and measuring in the computational basis. Since $Z_i^1 Z_j^1 S^{(2)}$ factorizes into a product of two-qubit operators, the circuit that diagonalizes it does as well. The details of the diagonalization depends upon the operator to be measured.

Because $Z_i^1 Z_j^1$ does not commute with $S^{(2)}$, the numerator and denominator of Equation (17) cannot be simultaneously computed. It is also not possible to measure the corrected expectation value corresponding to different choices of i and j simultaneously. More generally, it is not possible to measure any single tensor product of one-qubit operators at a time, regardless of the number of qubits it acts on.

Figure 6:
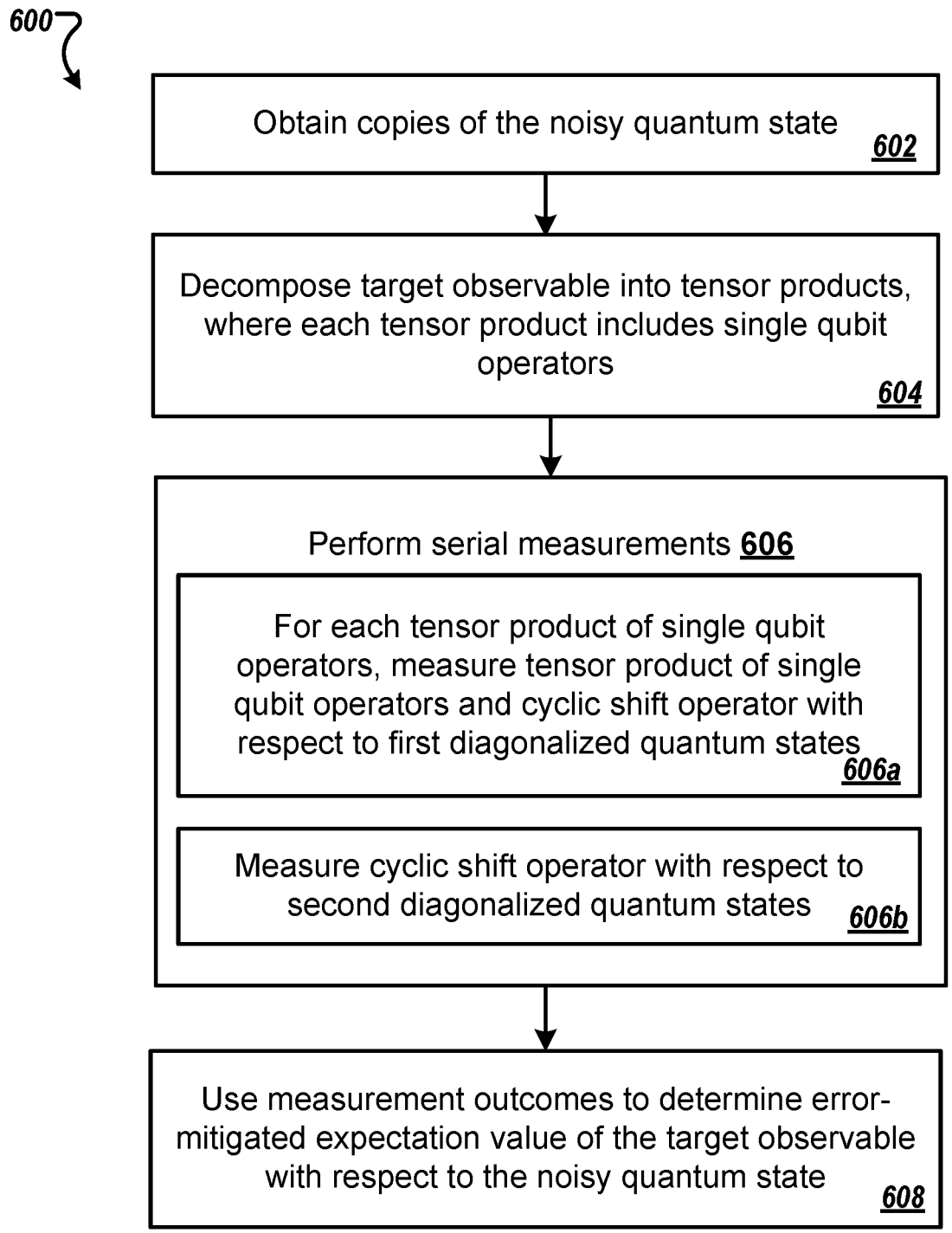
FIG. 6 is a flowchart of an example process for virtual distillation with serial measurements on two or more copies of the noisy quantum state, where the target observable acts on two or more qubits.

FIG. 6 is a flowchart of an example process 600 for virtual distillation with serial measurements on two or more copies of the noisy quantum state, where the target observable acts on two or more qubits. For convenience, the process 600 will be described as being performed by a system of one or more classical and quantum computing devices located in one or more locations. For example, the quantum computing device 200 of FIG. 2, appropriately programmed in accordance with this specification, can perform the process 600. Some of the steps described below are similar to steps described with respect to example process 300 and for brevity, details are not repeated.

The system obtains multiple copies of the noisy quantum state (step 602). The system decomposes the target observable into multiple tensor products, where each tensor product includes single-qubit operators (step 604). The system performs serial measurements on tensor products of M copies of the noisy quantum state (step 606). For each of tensor product of single qubit operators, the system performs a first number of measurement repetitions. Each measurement repetition includes applying a first diagonalization operator to a tensor product of the M copies of the noisy quantum state to obtain a first evolved quantum state, where the first diagonalization operator diagonalizes a product of i) the tensor product of one-qubit operators and ii) the cyclic shift operator, and measures a product of the tensor product of one-qubit operators and the cyclic shift operator with respect to the first evolved quantum state to obtain a respective first measurement outcome for each qubit in the first evolved quantum state (step 606a).

In addition, for each of a second number of measurement repetitions, the system applies a second diagonalization operator to a tensor product of the M copies of the noisy quantum state to obtain a second evolved quantum state, where the second diagonalization operator diagonalizes the cyclic shift operator. The system measures the cyclic shift operator with respect to the second evolved quantum state to obtain a respective second measurement outcome for each qubit in the second evolved quantum state (step 606b).

The system uses the obtained measurement outcomes to compute the error-mitigated expectation value of the target observable with respect to the noisy quantum state (step 608). For example, the system can compute an expectation value of the product of the target observable and the cyclic shift operator with respect to $\rho^{\otimes M}$ using the first measurement outcomes, compute an expectation value of the cyclic shift operator with respect to $\rho^{\otimes M}$ musing the second measurement outcomes, and divide the expectation value of the product of the target observable and the cyclic shift operator with respect to $\rho^{\otimes M}$ by the expectation value of the cyclic shift operator with respect to $\rho^{\otimes M}$.

Returning to FIG. 5, in response to determining that the target observable is a single qubit observable, the system performs a virtual distillation protocol with parallel measurements on two or more copies of the noisy quantum state (step 508).

For example, the system can perform virtual distillation with measurement by diagonalization with M=2, as described in example process 400 above. As another example, the system can perform virtual distillation with measurement by diagonalization with M>2 by generalizing example process 400 to higher powers of $\rho$.

Like the swap operator, the cyclic shift operator between M N-qubit systems, $S^{(M)}$, factorizes into a tensor product of N M-qubit gates. Specifically, it factorizes into the tensor product of N single-qubit cyclic shift operators. The symmetrized operator $$Z_k^{(M)} = \frac{1}{M}\sum_{i=1}^{M} Z_k^i$$

commutes with the operator $S^{(M)}$. Therefore, $Z_k^{(M)}S^{(M)}$ and $S^{(M)}$ are simultaneously diagonalizable even though $S^{(M)}$ is unitary but not Hermitian for M>2. Because $Z_k^{(M)}$ and $S^{(M)}$ both factorize into tensor products over N M-tuples of qubits, the unitary that diagonalizes these operators then factorizes into a tensor product of M-qubit operators in the same way. Accordingly, the process 400 described above with respect to FIG. 4 can be applied.

Similar concerns about determining corrected expectation values of multi-qubit observables described above with reference to step 506 for the two-copy (M=2) case apply to this generalized protocol. The tools developed so far allow for simultaneous estimation of $Tr(Z_k \rho^M)$ for all values of m and also $Tr(\rho^M)$. If $Tr(P\rho^M)$ is to be reconstructed for some multi-qubit Pauli operator P, a generalization of Equation (17) could be used, but this would be limited to measuring the operators required for one particular P at a time.

Figure 7:
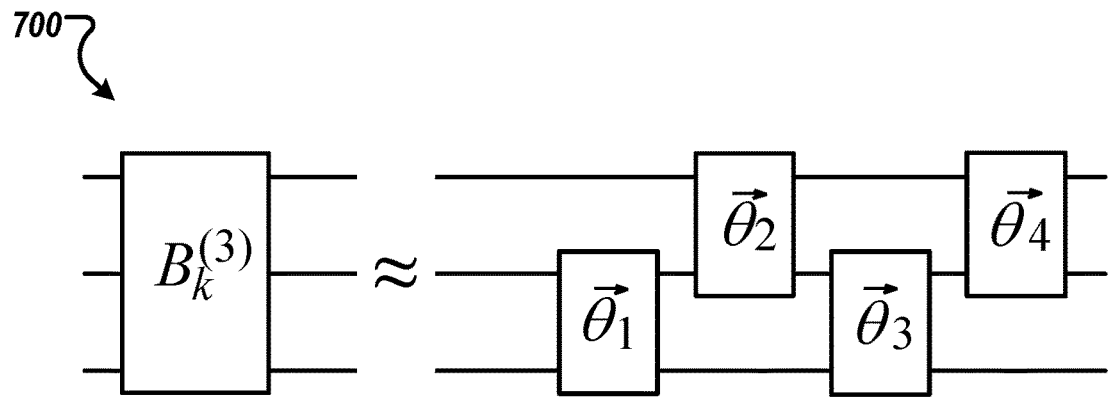
FIG. 7 shows an example ansatz for numerically optimizing a diagonalization gate
Figure 8:
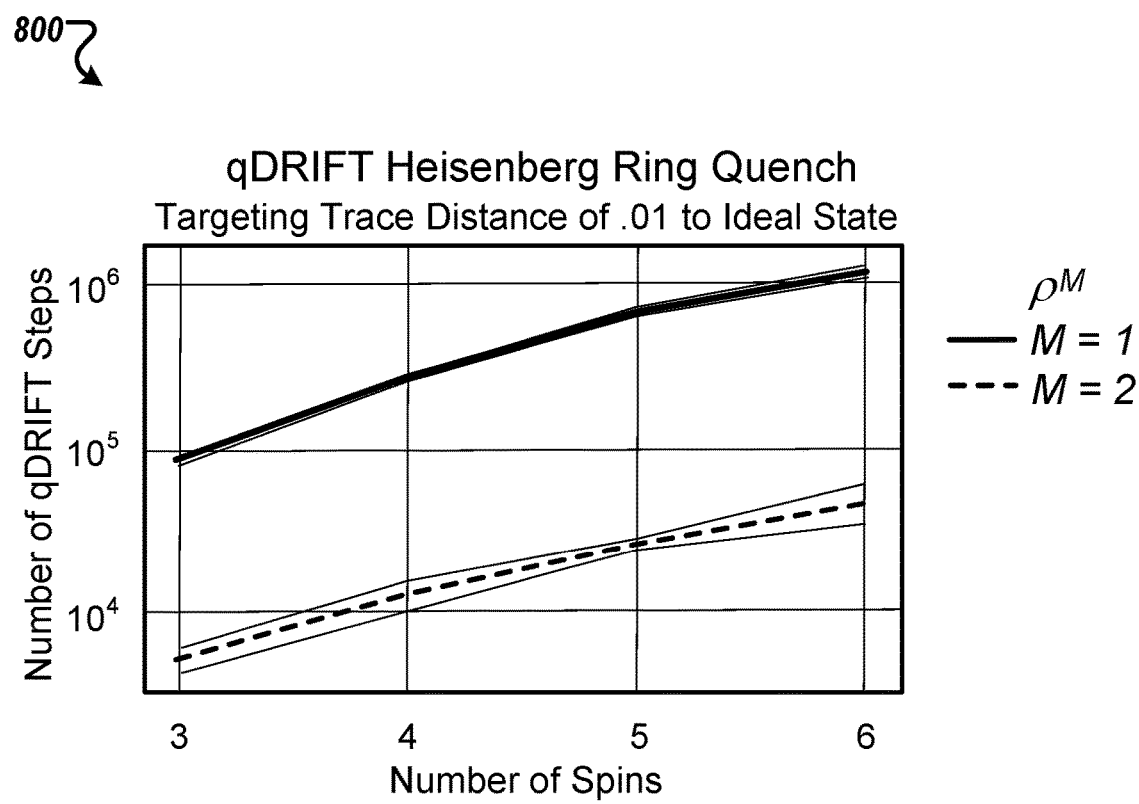
FIG. 8 is a plot showing qDRIFT coherent cost reduction through virtual distillation in the Heisenberg model.

For the specific case of M=3, a corresponding circuit can be optimized to simultaneously diagonalize $Z_k^{(3)}S_k^{(3)}$ and S (enabling an application of example process 400 with M=3). FIG. 7 shows an example ansatz for numerically optimizing a diagonalization gate $B_k^{(3)}$ (e.g., a gate satisfying properties similar to those satisfied by the gate defined in Equation (10)) that diagonalizes $Z_k^{(3)}S_k^{(3)}$ and $S_k^{(3)}$. In FIG. 7, $\vec{\theta}_i$ represents two-qubit gate parameters for an i-th arbitrary two-qubit gate. Parameters for the four two-qubit gates that allow for an error (measured in the Frobenius norm of the difference between the exact and approximate matrices) of approximately 5E-5 when the following equations are used $$B_k^{(3)} S_k^{(3)} B_k^{(3)\dagger} \to$$

$$\frac{1}{8}\Big(2 + (-3 - \sqrt{3}\,i)Z_k^1 + (3 - \sqrt{3}\,i)Z_k^1 Z_k^2 + (3 + \sqrt{3}\,i)Z_k^2 + 2i\sqrt{(3)}Z_k^1 Z_k^3 +$$

$$(3 - \sqrt{3}\,i)Z_k^2 Z_k^3\Big),$$

$$B_k^{(3)} Z_k^{(3)} B_k^{(3)\dagger} \to \frac{1}{3}(Z_k^1 + Z_k^2 + Z_k^3).$$

Returning to FIG. 5, in response to determining at step 502 that ancilla-assisted measurement is feasible, the system performs virtual distillation for arbitrary observables, with parallel measurement on any number M of copies of the noisy quantum state (step 510).

When performing virtual distillation with ancilla-assisted measurement, the form of the observables being measured is not restricted and simultaneous measurement of operators acting on overlapping subsets of qubits is possible. Therefore, virtual distillation with ancilla-assisted measurement is compatible with known techniques for efficiently measuring a large collection of commuting operators.

To perform virtual distillation with ancilla-assisted measurement on M=2 copies of the noisy quantum state, the system can approximate the numerator and denominator of Equation 8 using a non-destructive measurement of the swap operator $S^{(2)}$. For each of multiple measurement repetitions, the system prepares (or otherwise obtains) two quantum registers, where each register is prepared in the noisy quantum state ρ and includes an ancilla qubit prepared in the 0 state. The system performs a non-destructive measurement of $S^{(2)}$, e.g., using a swap or Hadamard test. Specifically, the system applies a Hadamard gate to the ancilla qubit, applies a cyclic shift operator to the two registers conditioned on the ancilla qubit being in the 1 state, and measures the ancilla qubit in the X basis to obtain a first measurement outcome. Because $S^{(2)}$ factorizes into a tensor product of two-qubit swap gates, its controlled version likewise factorizes into a series of N Fredkin (controlled-swap) gates. In some implementations compiling this circuit may necessitate some extra steps (such as expanding the single ancilla qubit into a GHZ state using a series of CNOT gates) in order to deal with the restricted connectivity of a near-term device.

Under the assumption that the target observable can be symmetrized, as described above with reference to example process 400, the system can then measure the product $O^{(2)}S^{(2)}$ by measuring the qubits in the two registers with respect to the target observable $O^{(2)}$ to obtain respective second measurement outcomes. The system can then use the first measurement outcomes and the second measurement outcomes from the different measurement repetitions to compute the error-mitigated expectation value of the target observable with respect to the noisy quantum state. In particular, the system can compute an expectation value of the target observable using the second measurement outcomes, compute an expectation value of the cyclic shift operator using the first measurement outcomes, and divide the expectation value of the target observable by the expectation value of the cyclic shift operator.

This protocol does not require a separate estimation of Tr(ρO). Furthermore, measurements of O on both copies of ρ can be used and the numerator and denominator of Equation (8) can be estimated simultaneously, leading to a relatively sample-efficient scheme.

For virtual distillation with ancilla-assisted measurement on M>2 copies of the noisy quantum state, $S^{(N)}$ is not Hermitian for N>2. However the natural generalization to the above strategy still works as expected. Specifically, a controlled version of the cyclic shift operator $S^{(N)}$ can be used to sample an observable whose expectation value is equal to Re $(Tr(S^{(N)}\rho^{\otimes N}))$. Because the symmetrized observable $O^{(N)}$ commutes with $S^{(N)}$, it also commutes with the observable measured by this generalization of the swap test. Therefore, an observable whose expectation value is $Tr(S^{(N)}O^{(N)}\rho^{\otimes N})$ can be sampled from by first performing the higher-order swap test and then a measurement of $O^{(N)}$.

Mitigating Algorithmic Errors

Most error mitigation methods focus on the reduction of errors caused by imperfections in a device implementation, such as decoherence or control errors. Some of these techniques can be applied to algorithmic errors incurred during otherwise noise-free implementations of randomized algorithms. Developments in Hamiltonian simulation have led to the development of randomized evolution methods such as qDRIFT, randomized Trotter, and combinations thereof, which have benefits in some situations over their deterministic counterparts. As these methods are randomized, they output mixed states rather than pure states, even in the absence of noise. Moreover, they depend on an approximation parameter with a natural limit in which they converge to the pure state generated by exact evolution. As described below, virtual distillation applied to qDRIFT can suppress this deviation from the exact evolution. For the particular model system considered below, it is found that virtual distillation can reduce the coherent space-time volume required to reach a particular accuracy threshold by a factor of 8 or more compared with the standard qDRIFT.

The qDRIFT method simulates time evolution under a Hamiltonian H by constructing product formulae using a randomized selection rule. Terms are chosen from H at random, with a selection probability proportional to their interaction strength in the Hamiltonian. The system is then evolved forwards in time under this Hamiltonian term, for a fixed time step. This process is repeated a number of times, generating a product formula that provides an approximation to the time evolution operator. When averaged over the classical randomness (in the choice of interaction terms), qDRIFT generates a quantum channel that closely approximates the exact evolution more closely than the individual product formulae. Importantly, unlike most deterministic Trotter methods, the scaling of this approach does not depend explicitly on the number of terms in the Hamiltonian, but rather than 1-norm of the coefficients.

Consider a Hamiltonian that can be decomposed as $H=\Sigma_i h_i H_i$, where all $h_i$ are can be made real and positive by absorbing signs into $H_i$, and the spectral norm of $H_i$ is bounded by 1. Defining $\lambda=\Sigma_i h_i$ the diamond norm distance between the qDRIFT channel and the true time evolution is bounded by $\epsilon=2\lambda^2 t^2/\eta$ where η is the number of qDRIFT selection steps performed to generate each instance of the qDRIFT channel, and hence controls the amount of coherent evolution required. As η increases, the resulting quantum channel converges to the unitary corresponding to the exact evolution.

The presently described virtual distillation technique can reduce the coherent space-time volume required, by reducing this factor η required to achieve the same error in practice. In particular, virtual distillation can impact the number of coherent steps, η, required to reach a target accuracy. For this, a Heisenberg Hamiltonian with up to 6 qubits per copy is considered. The Hamiltonian is given by $$H = \sum_{i=1}^{N} X_i X_{i+1} + Y_i Y_{i+1} + Z_i Z_{i+1} + h_i Z_i$$

where $h_i \in \{-h, h\}$ are randomly chosen Z magnetic field strengths, and periodic boundary conditions are applied such that site N+1 is site 1. For the presently described studies a time evolution length of t=N is considered and let h=1. The number of coherent qDRIFT steps required to achieve a trace distance of 0:01 to the ideal state for evolutions under such a Heisenberg model are numerically investigated.

FIG. 7 shows results of this analysis. In particular, FIG. 7 shows qDRIFT coherent cost reduction through virtual distillation in the Heisenberg model. The number of coherent qDRIFT steps required to reach a target trace distance, with and without virtual distillation using 2 copies, is shown. It can be seen that there is a consistent reduction of at least 16× in the number of required steps. When accounting for the over-head of using two copies, this amounts to a 8× reduction in the coherent space-time volume used to reach the same error rate. These results show that the use of the presently described error mitigation techniques can provide practical algorithmic improvements for real systems, especially in the NISQ regime. For example, by incorporating the presently described error mitigation techniques algorithms can produce more accurate results with reduced overhead, e.g., the overhead associated with quantum error correction codes.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for determining an error-mitigated expectation value of a target observable with respect to a noisy quantum state, the method performed by a system comprising a classical processor and a quantum computer, the method comprising:

obtaining, by the quantum computer, multiple copies of the noisy quantum state, wherein the noisy quantum state comprises stochastic errors resulting from noise on the quantum computer;

performing, by the quantum computer, measurements on tensor products of M copies of the noisy quantum state to compute an expectation value of the target observable with respect to an entangled quantum state, wherein the entangled quantum state is given by $\rho^M/\text{Tr}(\rho^M)$ where $\rho$ represents the noisy quantum state, $M \geq 1$, and eigenvalues corresponding to non-dominant eigenvectors of the noisy quantum state in the spectral decomposition of the entangled quantum state are suppressed exponentially in M;

performing, by the quantum computer, measurements on tensor products of M copies of the noisy quantum state to compute an expectation value of an identity operator with respect to the entangled quantum state; and dividing, by the classical processor, the computed expectation value of the target observable with respect to the entangled quantum state by the expectation value of the identity operator with respect to the entangled quantum state to determine the error-mitigated expectation value of the target observable with respect to the noisy quantum state, wherein the error-mitigated expectation value of the target observable with respect to the noisy quantum state comprises a reconstructed expectation value of the target observable with respect to a purified version of the noisy quantum state and approximates an expectation value of the target observable computed by the quantum computer in an absence of the stochastic errors and noise on the quantum computer.

2. The method of claim 1, wherein noise experienced by each copy of the noisy quantum state comprises a same form and strength.

3. The method of claim 1, wherein performing measurements on tensor products of M copies of the noisy quantum state to compute expectation values of the target observable with respect to an entangled quantum state comprises:

for each of a first number of measurement repetitions, measuring a product of i) the target observable and ii) a cyclic shift operator with respect to a tensor product of M copies of the noisy quantum state to obtain a first measurement outcome for each repetition;

computing, using the first measurement outcomes obtained from the first number of measurement repetitions, an expectation value of the product of i) the target observable and ii) a cyclic shift operator with respect to the tensor product of M copies of the noisy quantum state; and normalizing the expectation value of the product of i) the target observable and ii) a cyclic shift operator with respect to the tensor product of M copies of the noisy quantum state to obtain the error-mitigated expectation value of the target observable with respect to the noisy quantum state.

4. The method of claim 3, wherein normalizing the expectation value of the target observable comprises:

for each of a second number of measurement repetitions, measuring the cyclic shift operator with respect to a tensor product of M copies of the noisy quantum state to obtain a second measurement outcome for each repetition;

computing, using the second measurement outcomes obtained from the second number of measurement repetitions, an expectation value of the cyclic shift operator with respect to a tensor product of M copies of the noisy quantum state; and dividing the expectation value of the product of i) the target observable and ii) a cyclic shift operator with respect to the tensor product of M copies of the noisy quantum state by the expectation value of the cyclic shift operator with respect to the tensor product of M copies of the noisy quantum state.

5. The method of claim 1, wherein performing measurements on tensor products of M copies of the noisy quantum state comprises performing parallel measurements.

6. The method of claim 1, wherein $M \geq 2$ and the target observable acts on a single qubit.

7. The method of claim 6, wherein performing measurements on tensor products of M copies of the noisy quantum state comprises, for each of multiple measurement repetitions, wherein the multiple measurement repetitions comprise K measurement repetitions:

applying a diagonalization operator to a tensor product of M copies of the noisy quantum state to obtain an evolved quantum state, wherein the diagonalization operator diagonalizes i) a cyclic shift operator and ii) a product of a symmetrized version of the target observable and the cyclic shift operator, and measuring a product of the target observable and the cyclic shift operator with respect to the evolved quantum state to obtain a respective measurement outcome for the repetition for each qubit in the evolved quantum state.

8. The method of claim 7, further comprising:

computing an expectation value of the product of the target observable and the cyclic shift operator with respect to the evolved quantum state using the measurement outcomes obtained from the K measurement repetitions;

computing an expectation value of the cyclic shift operator with respect to the evolved quantum state using the measurement outcomes obtained from the K measurement repetitions; and dividing the expectation value of the product of the target observable and the cyclic shift operator with respect to the evolved quantum state by the expectation value of the cyclic shift operator with respect to the evolved quantum state.

9. The method of claim 7, wherein application of the cyclic shift operator couples qubits in a first copy of the noisy quantum state to corresponding qubits in each other copy of the noisy quantum state.

10. The method of claim 1, wherein performing measurements on tensor products of M copies of the noisy quantum state comprises performing serial measurements.

11. The method of claim 1, wherein $M \geq 2$ and the target observable acts on two or more qubits, the target observable comprising multiple tensor products of one-qubit operators.

12. The method of claim 11, wherein performing measurements on tensor products of M copies of the noisy quantum state comprises:

for each tensor product of one-qubit operators:
for each of a first number of measurement repetitions:
applying a first diagonalization operator to a tensor product of the M copies of the noisy quantum state to obtain an evolved quantum state, wherein the first diagonalization operator diagonalizes a product of i) the tensor product of one-qubit operators and ii) the cyclic shift operator, and measuring a product of the tensor product of one-qubit operators and the cyclic shift operator with respect to the evolved quantum state to obtain a respective first measurement outcome for the repetition of the first number of repetitions for each qubit in the evolved quantum state;

for each of a second number of measurement repetitions:
applying a second diagonalization operator to a tensor product of the M copies of the noisy quantum state to obtain a second evolved quantum state, wherein the second diagonalization operator diagonalizes the cyclic shift operator, and measuring the cyclic shift operator with respect to the second evolved quantum state to obtain a respective second measurement outcome for the repetition of the second number of repetitions for each qubit in the second evolved quantum state.

13. The method of claim 12, further comprising:
computing an expectation value of a product of the target observable and the cyclic shift operator using the first measurement outcomes obtained from the first number of measurement repetitions,
computing an expectation value of the cyclic shift operator using the second measurement outcomes obtained from the second number of measurement repetitions; and
dividing the expectation value of the product of the target observable and the cyclic shift operator by the expectation value of the cyclic shift operator.

14. The method of claim 1, wherein performing measurements on tensor products of M copies of the noisy quantum state to compute an expectation value of the target observable with respect to an entangled quantum state comprise performing ancilla-assisted measurements.

15. The method of claim 14, wherein the target observable comprises a single qubit operator or a multi-qubit operator.

16. The method of claim 14, wherein M≥2 and performing ancilla assisted measurements comprises, for each of multiple measurement repetitions:
preparing two quantum registers, where each quantum register comprises the noisy quantum state and an ancilla qubit prepared in the 0 state;
performing a non-destructive measurement of a cyclic shift operator, comprising:
applying a Hadamard gate to the ancilla qubit,
applying a cyclic shift operator to the two quantum registers conditioned on the ancilla qubit being in the 1 state, and
measuring the ancilla qubit in the X basis to obtain a first respective measurement outcome; and
measuring qubits in the two quantum registers with respect to a symmetrized version of the target observable to obtain respective second measurement outcomes.

17. The method of claim 16, further comprising:
computing an expectation value of the target observable using the second measurement outcomes; and
computing an expectation value of the cyclic shift operator using the first measurement outcomes; and
dividing the expectation value of the target observable by the expectation value of the cyclic shift operator.

18. An apparatus comprising:
one or more classical processors; and
one or more quantum computing devices in data communication with the one or more classical processors, wherein the quantum computing hardware comprises:
one or more qubit registers, each qubit register comprising one or more qubits, and
a plurality of control devices configured to operate the one or more qubit registers;
wherein the apparatus is configured to perform the method of determining an error-mitigated expectation value of a target observable with respect to a noisy quantum state, the method comprising:
obtaining, by the one or more quantum computing devices, multiple copies of the noisy quantum state, wherein the noisy quantum state comprises stochastic errors resulting from noise on the quantum computer;
performing, by the one or more quantum computing devices, measurements on tensor products of M copies of the noisy quantum state to compute an expectation value of the target observable with respect to an entangled quantum state, wherein the entangled quantum state is given by $\rho^M/\text{Tr}(\rho^M)$, where $\rho$ represents the noisy quantum state, M≥1, and eigenvalues corresponding to non-dominant eigenvectors of the noisy quantum state in the spectral decomposition of the entangled quantum state are suppressed exponentially in M;
performing, by the one or more quantum computing devices, measurements on tensor products of M copies of the noisy quantum state to compute an expectation value of an identity operator with respect to the entangled quantum state; and
dividing, by the one or more classical processors, the computed expectation value of the target observable with respect to the entangled quantum state by the expectation value of the identity operator with respect to the entangled quantum state to determine the error-mitigated expectation value of the target observable with respect to the noisy quantum state, wherein the error-mitigated expectation value of the target observable with respect to the noisy quantum state comprises a reconstructed expectation value of the target observable with respect to a purified version of the noisy quantum state and approximates an expectation value of the target observable computed by the quantum computer in an absence of the stochastic errors and noise on the quantum computer.

* * * * *